(12) United States Patent
Gaiardo

(10) Patent No.: US 8,272,369 B2
(45) Date of Patent: Sep. 25, 2012

(54) INTERNAL COMBUSTION ENGINE GAS FUEL FEED SYSTEM, AND RELATIVE ELECTRO-INJECTOR

(75) Inventor: Mario Gaiardo, Ivrea (IT)

(73) Assignee: Matrix S.p.A., Ivrea (IT)

( * ) Notice: Subject to any disclaimer, the term of this patent is extended or adjusted under 35 U.S.C. 154(b) by 284 days.

(21) Appl. No.: 12/517,011

(22) PCT Filed: Nov. 30, 2007

(86) PCT No.: PCT/IB2007/003706
§ 371 (c)(1),
(2), (4) Date: Aug. 17, 2009

(87) PCT Pub. No.: WO2008/068578
PCT Pub. Date: Jun. 12, 2008

(65) Prior Publication Data
US 2010/0019070 A1 Jan. 28, 2010

(30) Foreign Application Priority Data
Dec. 1, 2006 (IT) .............................. TO2006A0856

(51) Int. Cl.
*F02M 61/14* (2006.01)
*F02M 61/18* (2006.01)
(52) U.S. Cl. ........................................ 123/470; 123/490
(58) Field of Classification Search .................. 123/470, 123/490, 499, 527, 531; 239/585.1; 251/129.11, 251/129.15, 129.2; 137/625.44
See application file for complete search history.

(56) References Cited

U.S. PATENT DOCUMENTS

| 3,654,963 | A | * | 4/1972 | Ages ........................ 137/625.65 |
| 4,170,339 | A | * | 10/1979 | Ueda et al. .................. 251/129.2 |
| 4,397,443 | A | | 8/1983 | Watanabe et al. |
| 4,889,314 | A | * | 12/1989 | Hashizume et al. ...... 251/129.02 |
| 5,367,999 | A | * | 11/1994 | King et al. ..................... 123/458 |
| 5,711,553 | A | * | 1/1998 | Bonser .......................... 285/319 |
| 2005/0189021 | A1 | | 9/2005 | Wygnanski |

FOREIGN PATENT DOCUMENTS

| DE | 20119401 U1 | 4/2002 |
| EP | 0400504 A1 | 12/1990 |
| EP | 1267065 A2 | 12/2002 |
| EP | 1860314 A2 | 11/2007 |
| FR | 2347599 A1 | 11/1977 |
| GB | 1077801 A | 8/1967 |

* cited by examiner

*Primary Examiner* — Mahmoud Gimie
(74) *Attorney, Agent, or Firm* — Volpe and Koenig, P.C.

(57) ABSTRACT

A system for feeding gas fuel to an internal combustion engine, having: a fuel tank; fluidic connector along which fuel flows, and interposed fluidically between the tank and a cylinder of the engine; and an electro-injector fluidically in series with respect to the fluidic connector, and which is interposed between the tank and the cylinder, and is activated selectively to disable or enable fuel flow to the cylinder; the electro-injector is positioned with respect to the fluidic connector solely by connecting at least an inlet or outlet of the electro-injector to at least one pipe defined by the fluidic connector.

9 Claims, 2 Drawing Sheets

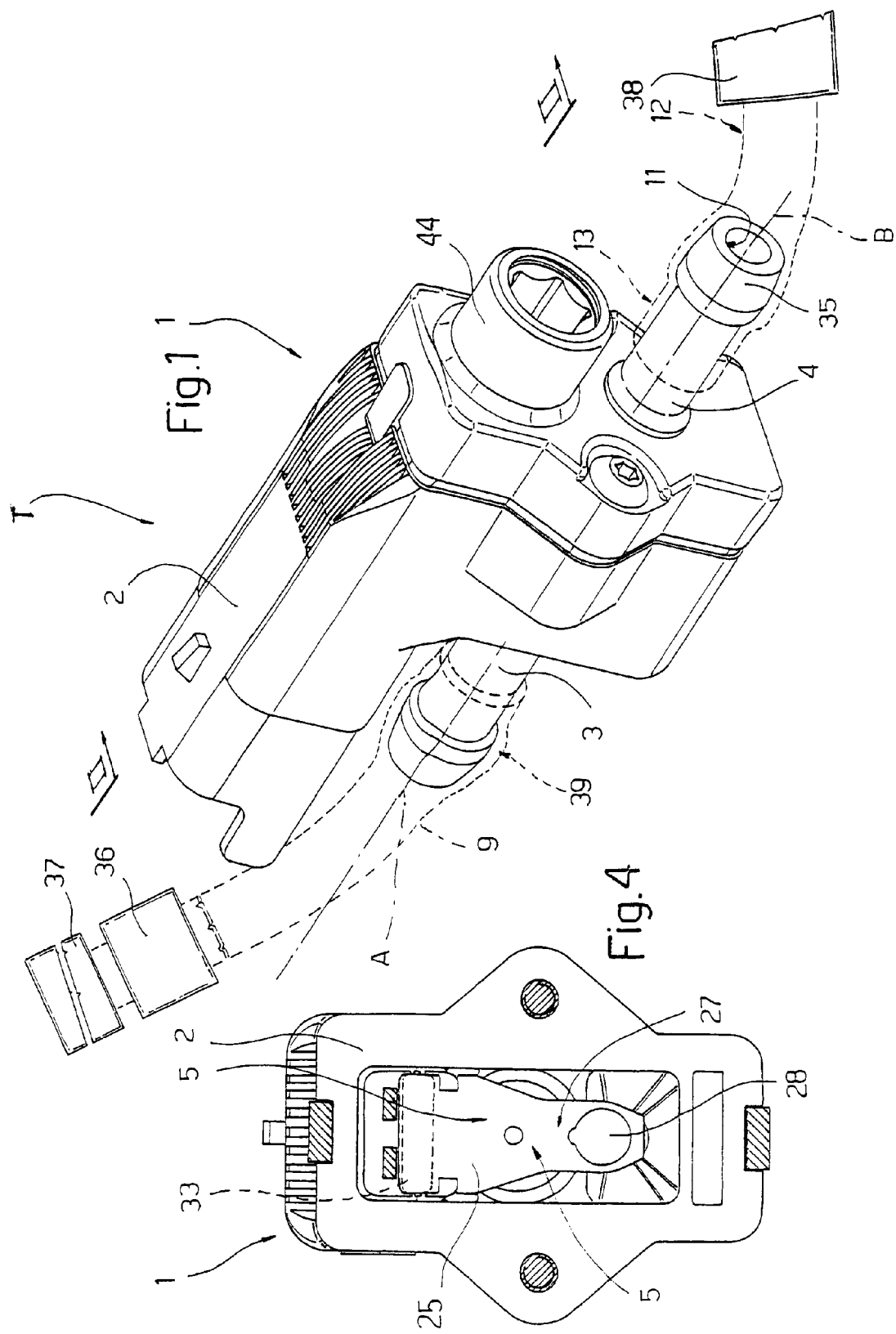

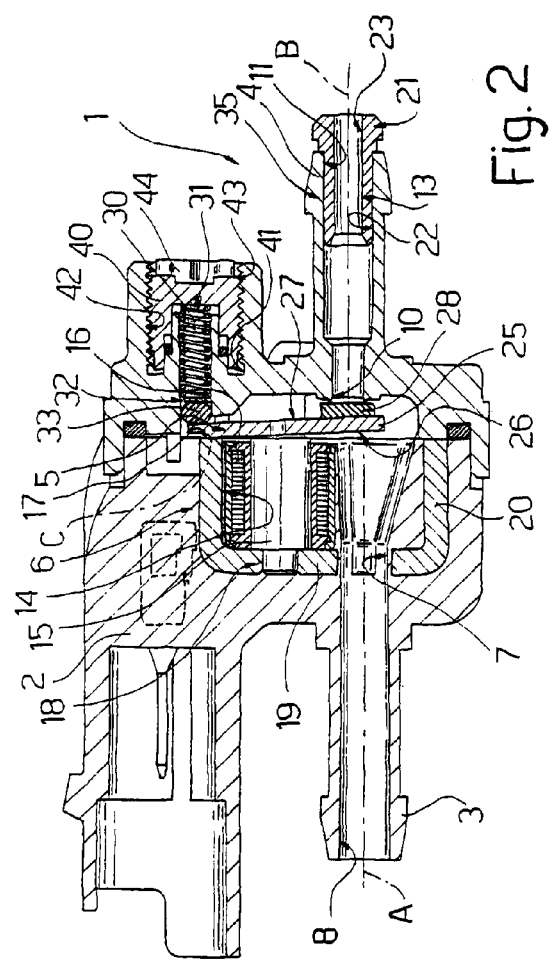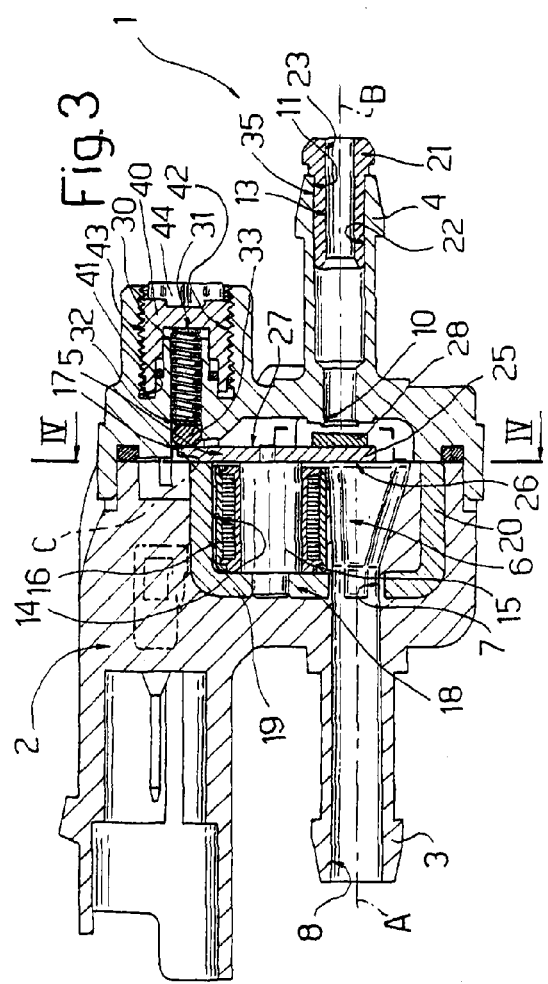

INTERNAL COMBUSTION ENGINE GAS FUEL FEED SYSTEM, AND RELATIVE ELECTRO-INJECTOR

TECHNICAL FIELD

The present invention relates to an internal combustion engine gas fuel feed system, and relative electro-injector.

BACKGROUND ART

Known gas fuel feed systems substantially comprise a tank of liquefied-gas fuel; a pressure reducer connected fluidically to the tank to reduce the pressure of the fuel and convert it to the gaseous state; and at least one electro-injector connected fluidically at opposite ends to the pressure reducer and the engine cylinders to selectively inject gas fuel into the cylinders at predetermined times.

More specifically, each electro-injector comprises a hollow casing defining an inlet connected fluidically to the pressure reducer; and a number of outlets connected fluidically to respective engine cylinders. The casing houses a number of armatures movable, by respective electromagnets controlled by a central control unit, between a closed configuration and an open configuration, in which they respectively prevent and permit gas fuel flow from the casing through a relative outlet, and injection by a respective intake pipe into a relative cylinder.

More specifically, each armature comprises a shutter, which is selectively brought to rest on the relative outlet.

When each armature is in the closed configuration, the relative shutter is held resting on the relative outlet of the electro-injector by a spring, so as to prevent gas fuel flow to the relative intake pipe and, from there, to the relative cylinder.

When each armature is in the open configuration, the relative shutter does not interfere with the relative outlet, thus allowing gas fuel flow to the relative cylinder.

The electro-injector is fixed in a predetermined position inside the engine compartment by connecting means interposed between the casing and the engine compartment.

Given the increasing complexity of automotive internal combustion engines and, hence, "crowding" of the engine compartment, the electro-injector may sometimes have to be located relatively far away from the cylinders or, at any rate, not in the best position in terms of engine performance.

In fact, the length of each intake pipe depends on the distance between the outlet of the relative electro-injector and an inlet section of the relative cylinder, once the electro-injector is fixed inside the engine compartment.

A need is felt within the industry for electro-injectors designed to ensure fast, highly accurate gas fuel injection into the cylinders in response to a control signal supplied, for example, by pressing an accelerator pedal.

This means minimizing the length and volume of each intake pipe to reduce the fall in gas fuel injection pressure caused by load losses along the intake pipe; and reducing the delay between generation of the control signal and gas fuel injection, which is substantially caused by inertia and compressibility of the gas in each intake pipe.

A need is also felt within the industry for electro-injectors adaptable to engines of different displacements and operating parameters, without involving the electromagnet central control unit.

Finally, a need is also felt within the industry to adjust, once the electro-injector is connected to the cylinders, the time taken by the armature to return to the closed configuration after the electromagnet ceases operating.

DISCLOSURE OF INVENTION

It is an object of the present invention to provide an internal combustion engine gas fuel feed system designed to meet at least one of the aforementioned requirements of known feed systems.

According to the present invention, there is provided an internal combustion engine gas fuel feed system.

The present invention also relates to an electro-injector for an internal combustion engine gas fuel feed system.

BRIEF DESCRIPTION OF THE DRAWINGS

A preferred, non-limiting embodiment of the present invention will be described by way of example with reference to the accompanying drawings, in which:

FIG. 1 shows a view in perspective of an internal combustion engine gas fuel feed system in accordance with the present invention;

FIG. 2 shows a section, along line II-II in FIG. 1, of an electro-injector of the FIG. 1 system in a closed configuration;

FIG. 3 shows the FIG. 2 electro-injector in an open configuration;

FIG. 4 shows a section along line IV-IV in FIG. 3.

BEST MODE FOR CARRYING OUT THE INVENTION

With reference to the accompanying drawings, T indicates a system for feeding gas fuel to an internal combustion engine.

More specifically, system T comprises a tank 37 of liquefied-gas fuel; a pressure reducer 36 connected fluidically to tank 37 to reduce the pressure of the fuel and convert it to the gaseous state; and one or more electro-injectors 1 supplied with gas fuel from pressure reducer 36 and in turn supplying corresponding cylinders 38 of the internal combustion engine.

The following description refers to a system T comprising one electro-injector 1 and one cylinder 38.

Electro-injector 1 substantially comprises a hollow casing 2 having an inlet 3 connected fluidically to pressure reducer 36, and an outlet 4 connected fluidically to engine cylinder 38; and an armature 5 (shown in FIGS. 2 to 4) housed inside casing 2. Armature 5 is activated by an electromagnet 6 (FIGS. 2 and 3) to selectively connect inlet 3 and outlet 4 fluidically to prevent or permit gas fuel flow to cylinder 38.

More specifically, inlet 3 and outlet 4 project from opposite ends of casing 2, and extend along respective axes A and B.

Inlet 3 and outlet 4 are connected to pressure reducer 36 and cylinder 38, respectively, by fluidic connecting means. More specifically, the fluidic connecting means comprise an inlet pipe 9 interposed between pressure reducer 36 and inlet 3; and an outlet pipe 12 interposed between outlet 4 and cylinder 38, and defining an intake pipe of cylinder 38.

Inlet 3 has an axial end opening 7 facing inwards of casing 2; and an end opening 8 axially opposite opening 7 and connected fluidically by inlet pipe 9 (FIG. 1) to pressure reducer 36.

Outlet 4 has an end opening 10 facing inwards of casing 2; and an opening 11 located at the opposite end to opening 10 and connected fluidically to cylinder 38. More specifically, cylinder 38 and opening 11 are connected fluidically by outlet pipe 12 (FIG. 1).

Outlet pipe 12 (FIGS. 1 to 3) comprises a first end portion 13 connected in gastight manner to opening 11; and a second end portion opposite portion 13 and connected fluidically in known manner to cylinder 38.

Casing 2 being hollow, opening 7 of inlet 3 and opening 10 of outlet 4 open into a cavity 14 housing armature 5 and electromagnet 6.

Electromagnet 6 (FIGS. 2 and 3) comprises a core 15 of magnetic material; and a coil 16 wound about core 15, and which is selectively powered electrically by a number of electric terminals (not shown) and a central control unit (not shown) to generate a magnetic field about armature 5.

Electromagnet 6 (FIGS. 2 and 3) is surrounded by a cup-shaped member 18 extending along an axis parallel to axes A, B.

More specifically, member 18 comprises a rectangular axial end wall 19 perpendicular to axes A and B and fitted through with an end portion of inlet 3 adjacent to opening 7; and a flat lateral wall 20 extending, parallel to axes A and B, from end wall 19 towards outlet 4.

Armature 5 is housed inside casing 2 so as to be interposed axially between an axial end 17 of lateral wall 20, opposite end wall 19, and opening 10 of outlet 4.

More specifically, armature 5 comprises an oblong plate 25 of magnetic material.

Plate 25 has opposite surfaces 26, 27 (FIGS. 2 and 3) facing electromagnet 6 and opening 10 of outlet 4 respectively.

Armature 5 also comprises a disk shutter 28 made of elastomeric material and located on a side of surface 27 facing opening 10.

The side of surface 26 opposite disk shutter 28 rests on end 17 of lateral wall 20.

Electro-injector 1 (FIGS. 2 and 3) also comprises a coil spring 30 extending parallel to axes A, B.

Spring 30 has an axial end 31 cooperating with casing 2; and an end 32 opposite end 31 and cooperating with a bar 33 (FIGS. 1, 2, 3) of soft material extending in a direction substantially parallel to the plane of plate 25.

On the opposite side to spring 30, bar 33 cooperates with surface 27 of plate 25. More specifically, a lateral portion of surface 27, opposite disk shutter 28, cooperates with bar 33.

Spring 30 is designed to load armature 5 into a closed configuration (FIG. 2), in which plate 25 is tilted slightly with respect to axes A and B, and disk shutter 28 engages opening 10 of outlet 4 in gastight manner to prevent fluidic connection of outlet 4 and inlet 3 and, hence, gas fuel flow to cylinder 38.

Plate 25, bar 33, and lateral wall 20 of member 18 are so arranged that plate 25 rotates about an axis C (FIGS. 2 and 3) parallel to and offset with respect to the extension direction of bar 33. More specifically, axis C corresponds to a contact segment between plate 25 and end 17 of lateral wall 20.

When powered with electric current, coil 16 of electromagnet 6 generates a magnetic field, which is amplified by core 15, and which produces in known manner a magnetic force on plate 25 directed substantially parallel to axis A.

More specifically, the magnetic force and the return force of spring 30 are applied on plate 25 at separate points at a distance from axis C, so that spring 30 and the current circulating in coil 16 generate two opposing rotation torques on plate 25. Electromagnet 6 is powered by the central control unit to generate a rotation torque on plate 25 in the opposite direction to and greater than the rotation torque generated on plate 25 by spring 30.

The resultant of said torques rotates armature 5—clockwise in the example shown—about axis C into an open configuration (FIG. 3), in which plate 25 lies in a plane parallel to axis C, and disk shutter 28 opens opening 10 of outlet 4.

Outlet 4 and inlet 3 are therefore connected fluidically, so that gas fuel flows through casing 2 and outlet 4, and along outlet pipe 12 to engine cylinder 38.

Electro-injector 1 is advantageously positioned, with respect to outlet pipe 12 and inlet pipe 9, solely by connecting one of inlet 3 and outlet 4 to one of inlet pipe 9 and outlet pipe 12.

More specifically, electro-injector 1 is positioned with respect to outlet pipe 12 by connecting outlet 4 to end portion 13 of outlet pipe 12, at the opposite end to cylinder 38.

And electro-injector 1 is positioned with respect to inlet pipe 9 by connecting inlet 3 to an axial end portion 39 of inlet pipe 9, located at the opposite end to pressure reducer 36.

Electro-injector 1 therefore does not need to be fixed to the engine compartment, e.g. by additional connecting means, to secure casing 2 in a predetermined position with respect to outlet pipe 12 or inlet pipe 9 or both.

More specifically, portion 13 is fitted onto the outside of outlet 4, and has an internal tubular flow reducer 21, which is interference-fitted coaxially inside a portion 35 of outlet 4 adjacent to opening 11. Alternatively, reducer 21 is connected (in a manner not shown) to portion 35 by a threaded connection.

More specifically, reducer 21 comprises a surface 22 cooperating in gastight manner with an inner surface of portion 35; and a surface 23 radially inner with respect to surface 22, and, as explained in detail below, of such a diameter as to regulate flow to the cylinder.

Axes A and B of inlet 3 and outlet 4 are parallel and slightly offset with respect to each other (FIGS. 2 and 3).

Inlet pipe 9 is made of flexible material to bend easily to the desired radius of curvature.

As a result, loss of pressure of the gas fuel between pressure reducer 36 and opening 8 is reduced, if inlet pipe 9 has to be bent when assembling electric injector 1 to the engine.

Similarly, outlet pipe 12 is also made of flexible material to bend easily to the desired radius of curvature, so that loss of pressure of the gas fuel between opening 11 and cylinder 38 is reduced, if outlet pipe 12 has to be bent.

The axial preload of spring 30 is adjustable to adjust the magnetic force required to move plate 25 from the closed to the open configuration, and therefore also the time taken to restore plate 25 from the open to the closed configuration, once the central control unit ceases to power electromagnet 6 by means of the electric terminals.

More specifically (FIGS. 2 and 3), end 31 of spring 30 cooperates with a body 40 housed in axially movable manner inside a cavity 41 of casing 2. More specifically, body 40 and cavity 41 are coaxial with each other and with spring 30.

On the opposite side to spring 30, body 40 is bounded by a threaded surface 42 which engages a threaded surface 43 of cavity 41 of casing 2. More specifically, surface 43 defines cavity 41 on the side facing spring 30.

Body 40 has an axial end opposite end 31 of spring 30, and which cooperates with an actuating member 44 (FIGS. 1 to 3) engageable by a wrench to adjust the relative axial position of the threads of surfaces 42, 43, and hence the axial preload of spring 30.

Actuating member 44 is easily accessible from outside casing 2 for easy insertion of the wrench.

Surface 22 of reducer 21 has a diameter calibrated to engage portion 35 in gastight manner; and the diameter of surface 23 of reducer 21 is selectable from a wide range to adapt the amount of gas fuel injected into the cylinder to the displacement and other significant parameters of the engine.

Casing 2 is preferably made of plastic to reduce overall weight and the overall load exerted on the connection between portion 35 and portion 13, and on the connection between inlet 3 and inlet pipe 9.

In actual use, the liquefied gas in tank 37 flows through pressure reducer 36, in which it is decompressed to the gaseous state.

The gas fuel flows along inlet pipe 9 to inlet 3 of electro-injector 1, which selectively enables or disables gas fuel flow along outlet pipe 12 and, hence, injection into cylinder 38.

Operation of electro-injector 1 is described below as of a condition in which armature 5 is in the closed configuration (FIG. 2).

In the closed configuration, disk shutter 28 engages opening 10 of outlet 4 in gastight manner to prevent the gas fuel fed into casing 2 along inlet pipe 9 from flowing along outlet pipe 12 to cylinder 38.

Armature 5 is loaded into the closed configuration by spring 30 and bar 33 acting on plate 25.

Armature 5 is moved from the closed to the open configuration in response to an external command, e.g. pressing of a pedal.

More specifically, in response to the external command, the central control unit supplies the electric terminals and coil 16 with electric current.

The electric current circulating in coil 16 produces a magnetic field that is amplified by core 15.

Spring 30 and the magnetic field of coil 16 act on plate 25 at points spaced apart and at a distance from axis C.

Plate 25 is thus subjected to two rotation torques about axis C, one generated by spring 30 and the other by coil 16, and which are opposite in direction and differ in absolute value, depending on the direction of the current circulating in coil 16.

The resultant of the two torques rotates armature 5 clockwise about axis C in opposition to spring 30.

Spring 30 is compressed, and disk shutter 28 (FIG. 3) releases opening 10 to connect inlet 3 fluidically to outlet 4.

The gas fuel in casing 2 thus flows through opening 10 and outlet 4, and along outlet pipe 12 into cylinder 38.

When the external command ceases, the central control unit cuts off electric current to coil 16 and, hence, the magnetic force exerted on armature 5.

Armature 5 is thus restored from the open to the closed configuration.

More specifically, spring 30 expands to rotate armature 5 anticlockwise about axis C until disk shutter 28 comes to rest in gastight manner against opening 10 of outlet 4, thus cutting off gas fuel flow to outlet pipe 12 and cylinder 38.

The magnetic force required to overcome spring 30 and the time taken to restore armature 5 from the open to the closed configuration are selectively adjustable using a wrench on actuating member 44 to adjust the preload of spring 30.

More specifically, adjusting actuating member 44 adjusts the relative axial position of the threads of surfaces 42, 43 of body 40 and cavity 41, and hence the preload of spring 30.

Moreover, by selecting a reducer 21 with a specific diameter of surface 23, gas fuel flow to cylinder 38 can be adapted to given displacements and other characteristic engine parameters without involving the central control unit of electromagnet 6.

The advantages of system T and electro-injector 1 according to the present invention will be clear from the above description.

In particular, by only comprising an inlet 3, outlet 4, and armature 5, the size of electro-injector 1 is reduced to a minimum, which means it need not be fixed to the engine compartment, and can be supported directly by inlet and outlet pipes 9, 12 connecting it to tank 37 and cylinder 38 respectively. In other words, electro-injector 1 may be mounted in "floating" manner to inlet and outlet pipes 9, 12.

This therefore provides for considerable freedom in terms of location and assembly of electro-injector 1 inside the engine compartment, and for locating outlet 4 extremely close to an inlet section of relative cylinder 38.

As a result, the overall length of outlet pipe 12 is greatly reduced.

Reducing the length of the outlet pipe reduces load losses along outlet pipe 12, so that the pressure at which the gas fuel is injected into cylinder 38 is closer to the gas fuel pressure through opening 10 and, hence, to the external command pressure.

Moreover, the amount of gas fuel inside outlet pipe 12 is also reduced, thus reducing the delay between generation of the external command and injection of the gas fuel into cylinder 38, caused by inertia and compressibility of the gas fuel inside outlet pipe 12 at the injection stage.

Electro-injector 1 permits adjustment of the time taken by armature 5 to move from the open to the closed configuration, and of the force required by electromagnet 6 to overcome spring 30.

Moreover, adjustment is made by simply adjusting actuating member 44 to adjust the relative axial position of the threads of surfaces 42, 43.

Moreover, being made of flexible material, inlet and outlet pipes 9, 12 can be bent to the desired radius of curvature, thus reducing gas fuel pressure losses between pressure reducer 36 and inlet 3, and between outlet 4 and cylinder 38.

Finally, electro-injector 1 is adaptable to engines of different displacements and characteristic parameters, without involving the central control unit of electromagnet 6, and by simply employing reducers 21 with a given diameter of surface 23.

Clearly, changes may be made to system T and electro-injector 1 as described and illustrated herein without, however, departing from the scope defined in the accompanying Claims.

The invention claimed is:

1. A gas fuel feeding system (T) for an internal combustion engine, comprising:
   a fuel tank (37);
   a fluidic connector (9, 12) along which said fuel flows, and interposed fluidically between said tank (37) and a cylinder (38) of said engine; and
   an electro-injector (1) fluidically in series with respect to said fluidic connector (9, 12), and which is interposed between said tank (37) and said cylinder (38), and is activated selectively to disable or enable flow of said fuel to the cylinder (38); said electro-injector (1) is positioned and held in place with respect to said fluidic connector (9, 12) solely by connecting at least an inlet or outlet (3, 4) of the electro-injector to at least one pipe (9, 12) defined by said fluidic connector (9, 12); wherein said electro-injector (1) is not fixed to said cylinder (38) and is mounted in floating manner to said pipe (9, 12) without additional securing means.

2. A system as claimed in claim 1, wherein said electro-injector (1) defines at least one outlet (4) through which said fuel flows selectively; and said pipe (9, 12) is defined by an outlet pipe (12) for feeding said fuel to said cylinder (38); said outlet pipe (12) comprising an end portion (13) engaging said outlet (4), and being connectable fluidically to said cylinder (38) at the opposite end to said end portion (13).

3. A system as claimed in claim 1, wherein said electro-injector (1) defines at least one inlet (3) through which said fuel flows; and said pipe (9, 12) is defined by an inlet pipe (9) for feeding said fuel to said electro-injector (1); said inlet pipe (9) comprising an end portion (39) engaging said inlet (3), and being connected fluidically to said tank (37) at the opposite end to said end portion (39).

4. A system as claimed in claim 1, wherein said pipe (9, 12) is made of flexible material.

5. A system as claimed in claim 1, wherein said electro-injector (1) comprises a casing (2) defining said inlet (3) and said outlet (4); said fuel flowing through said inlet (3) before said outlet (4); and said inlet (3) and said outlet (4) have respective axes (A, B) parallel to each other.

6. A system as claimed in claim 5, further comprising a shutter (28) housed in said casing (2) and movable between a first configuration, in which it interferes with said outlet (4) to prevent throughflow of said fuel, and a second configuration, in which it opens said outlet (4) to permit throughflow of said fuel; said electro-injector (1) comprising an elastic biasing element (30, 33) for loading said shutter (28) into said first configuration, and which has a selectively adjustable preload.

7. A system as claimed in claim 6, wherein said elastic biasing element (30, 33) comprises a spring (30) having a first portion (32) connected functionally to said shutter (28), and a second portion (31) cooperating with a body (40) movable axially inside said casing (2); the relative axial position of said body (40) and said casing (2) being adjustable to adjust said preload.

8. A system as claimed in claim 7, further comprising an actuating member (44) adjustable from outside said casing (2) to adjust said preload.

9. A system as claimed in claim 5, wherein said casing (2) is made of plastic.

\* \* \* \* \*